(12) United States Patent
Mandriota

(10) Patent No.: US 7,958,640 B1
(45) Date of Patent: Jun. 14, 2011

(54) POLE SAW HEAD HAVING A ROPE SETTING AUXILIARY HOOK

(76) Inventor: Dane M. Mandriota, Lake Ronkonkoma, NY (US)

(*) Notice: Subject to any disclaimer, the term of this patent is extended or adjusted under 35 U.S.C. 154(b) by 182 days.

(21) Appl. No.: 12/386,083

(22) Filed: Apr. 14, 2009

(51) Int. Cl.
  *B23D 51/10* (2006.01)
(52) U.S. Cl. .................. 30/144; 30/166.3; 30/296.1
(58) Field of Classification Search .......... 30/122, 30/123, 144, 166.3, 296.1
  See application file for complete search history.

(56) References Cited

U.S. PATENT DOCUMENTS

| | | | |
|---|---|---|---|
| 419,311 A | | 1/1890 | Bosch |
| 1,124,991 A | * | 1/1915 | Bartlett ........................ 30/251 |
| 1,179,595 A | * | 4/1916 | Wood ........................... 30/144 |
| 1,197,430 A | * | 9/1916 | Barnes et al. ................ 30/241 |
| 1,761,469 A | * | 6/1930 | Donkel ......................... 30/249 |
| 2,247,723 A | | 7/1941 | Chial |
| 2,286,418 A | | 6/1942 | Hoyt |
| 3,181,239 A | * | 5/1965 | Skok ............................. 30/374 |
| 3,360,859 A | | 1/1968 | Watson |
| 3,835,535 A | * | 9/1974 | Robison et al. ............... 30/249 |
| 3,949,440 A | * | 4/1976 | Guerra ........................... 7/148 |
| 4,033,036 A | * | 7/1977 | Morris .......................... 30/144 |
| 4,461,081 A | * | 7/1984 | Gaskins ........................ 30/144 |
| 4,730,409 A | * | 3/1988 | Mitchell et al. ................ 43/25 |
| 5,092,047 A | * | 3/1992 | Hinkley ...................... 30/166.3 |
| D336,835 S | | 6/1993 | Lutzke |
| 5,241,752 A | | 9/1993 | Lutzke et al. |
| 6,526,664 B2 | | 3/2003 | Cech |
| 6,785,969 B2 | * | 9/2004 | Wang ............................ 30/244 |

FOREIGN PATENT DOCUMENTS

FR          2 589 317    * 5/1987

* cited by examiner

*Primary Examiner* — Hwei-Siu C Payer
(74) *Attorney, Agent, or Firm* — Richard L. Miller

(57) ABSTRACT

A pole saw head which comprises a cheek plate having an integral downwardly curved arm and an integral upwardly rope setting auxiliary notched hook strategically positioned on an end of the arm. The notched hook will hold a loop of a length of rope tied in a monkey's fist knot thereto. A mechanism is for coupling the cheek plate to a top end of a pole. When the pole is manually manipulated by a person grasping the pole the notched hook can release the loop on the monkey's fist knot, so that the monkey's fist knot will appropriately uncoil when the rope is tossed over a branch of a tree.

4 Claims, 2 Drawing Sheets

Fig. 1
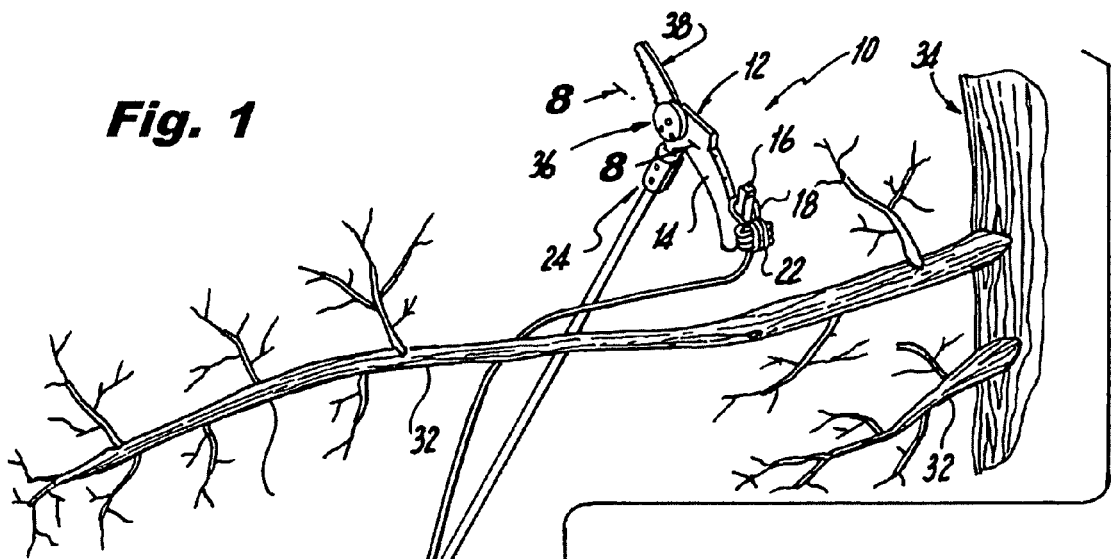
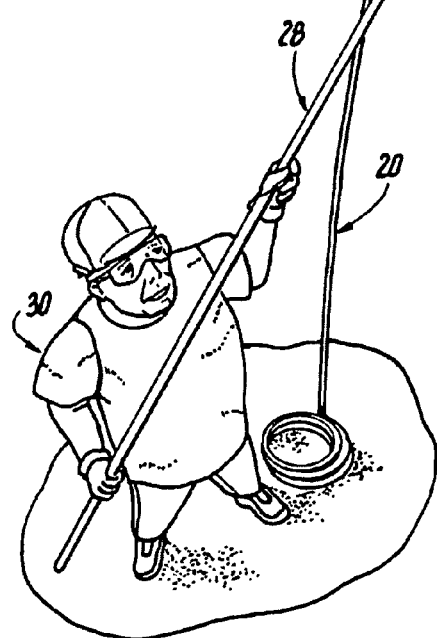
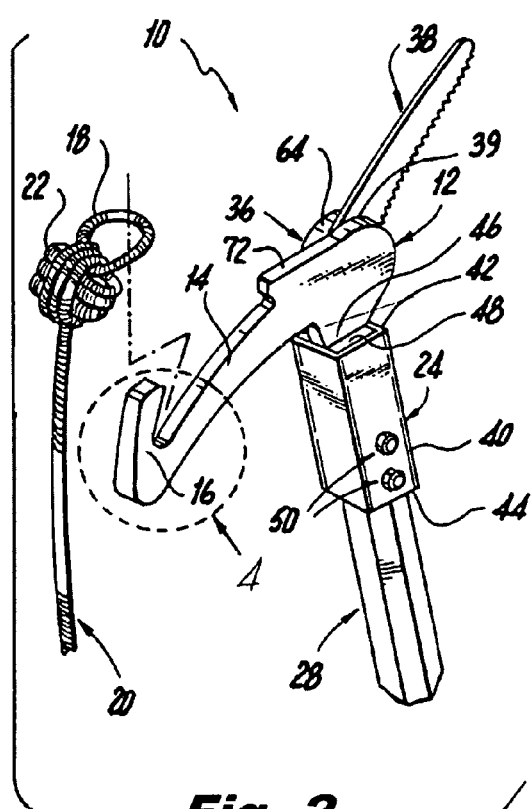
Fig. 2
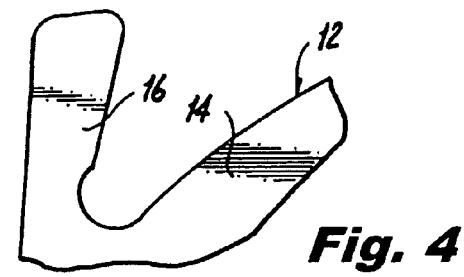
Fig. 4

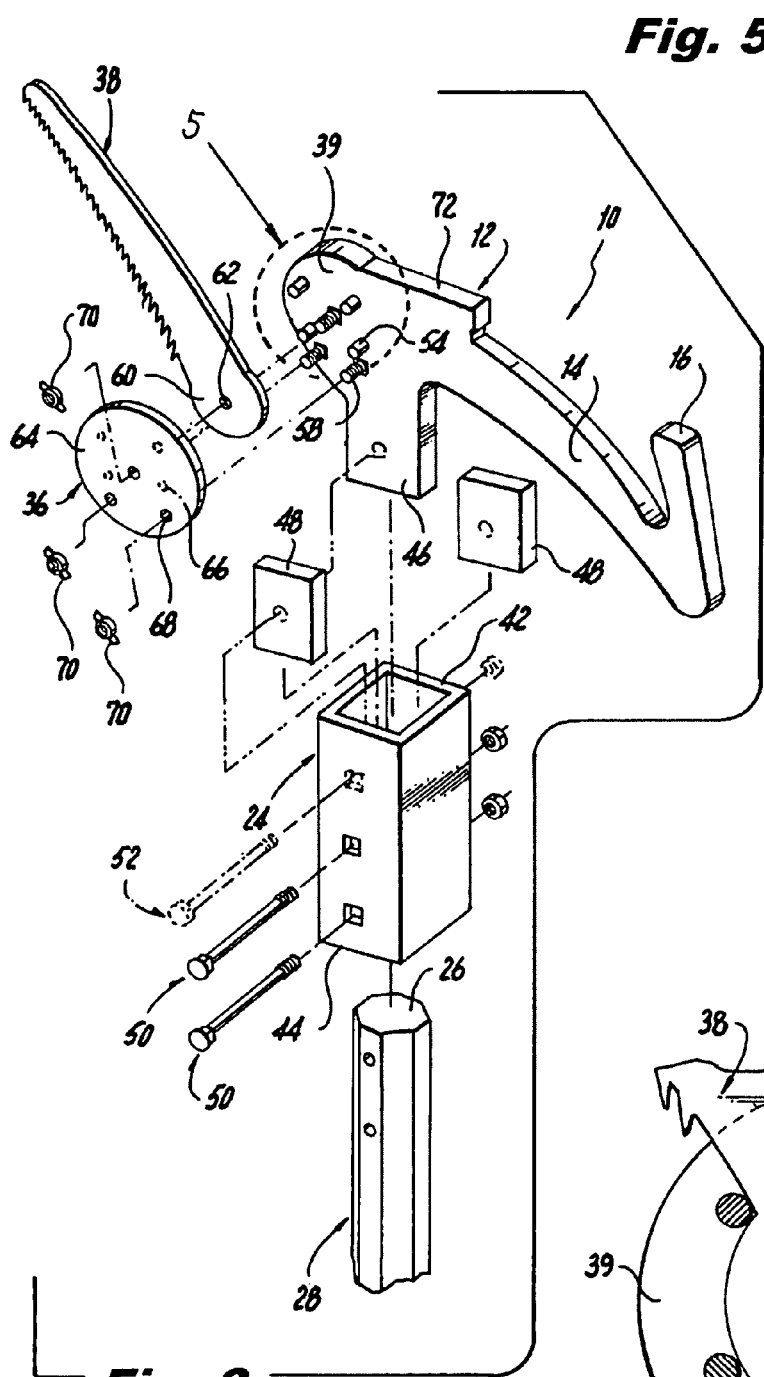
Fig. 3
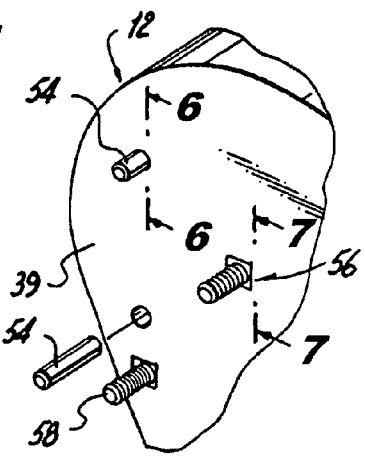
Fig. 5
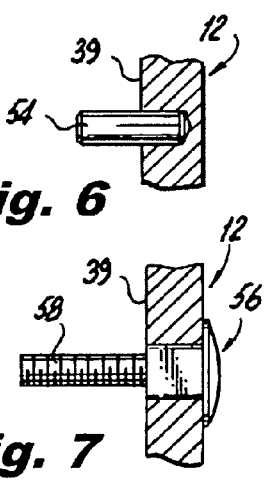
Fig. 6
Fig. 7
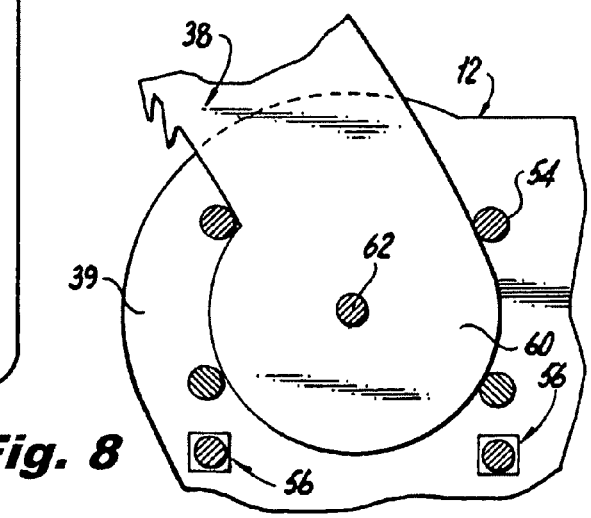
Fig. 8

POLE SAW HEAD HAVING A ROPE SETTING AUXILIARY HOOK

BACKGROUND OF THE INVENTION

1. Field of the Invention

The present invention relates to a tree trimmer, and more particularly, a pole saw head having a rope setting auxiliary hook.

2. Description of the Prior Art

Numerous innovations for pruning tools have been provided in the prior art that will be described. Even though these innovations may be suitable for the specific individual purposes to which they address, however, they differ from the present invention.

A FIRST EXAMPLE, U.S. Pat. No. 419,311, Issued on Jan. 14, 1890, to Bosch teaches a combination with a saw, of a sectional pole to which the saw is connected, a short metallic tube formed with split ends adapted to receive the ends of the pole sections, bands around each end of the tube, and set screws for fastening the bands, whereby the pole may be lengthened, as and for the purpose hereinbefore set forth.

A SECOND EXAMPLE, U.S. Pat. No. 1,761,469, Issued on Jun. 3, 1930, to Donkel teaches an implement of the class described, the combination of a pair of joined hook-shaped frame members, the members being spaced at their hook portions, a rotatable cutter, a pair of guard plates carrying the cutter, means for pivotally mounting the plates between the members, the axis of pivotal movement passing within the peripheral edge of the cutter, an operating lever secured to the plates, and a coil spring interposed between the lever and the frame tending normally to hold the cutter away from the hook portion of the frame members.

A THIRD EXAMPLE, U.S. Pat. No. 2,247,723, Issued on Jul. 1, 1941, to Chial teaches a hydraulic pruning apparatus comprising a pole, a liquid containing tank mounted on the pole, a hook secured to one end of the tank, a pivoted blade mounted on the hook and cooperating with the hook in pruning trees, a main cylinder mounted at one side of the tank and disposed longitudinally thereof, an elongated piston operating in the cylinder, rods connected with the lower end of the elongated piston, the rods being also connected with the pivoted blade, means for establishing communication between the tank and the main cylinder, the means comprising a pump cylinder and pipes leading from the pump cylinder to the main cylinder, valves for controlling the passage of liquid from the pump cylinder to the main cylinder, a pump operating the pump cylinder and adapted to force liquid from the tank into the upper end of the main cylinder, operating the piston and pivoted blade, and a manually controlled valve adapted to be operated whereby liquid from the main cylinder may pass to the tank, and a spring for moving the pivoted blade and piston to their normal inactive positions.

A FOURTH EXAMPLE, U.S. Pat. No. 2,286,418, Issued on Jun. 16, 1942, to Hoyt teaches a pole saw head comprising a pole ferrule having on its upper end a check plate for securing a saw blade, a hook overhanging one side of the ferrule in the plane of the cheek plate, the hook having its concave side stepped to form both large and small seats for engagement of branches, the large seat being substantially parallel sided and for greater depth than its width.

A FIFTH EXAMPLE, U.S. Pat. No. 3,360,859, Issued on Jan. 2, 1968, to Watson teaches a pruning cutter in which a blade is mounted for operation within a slot between opposite outer faces of a hook-like extremity arranged to be mounted on the end of a pole, the blade being pivoted upon a pin extending at both ends beyond the outer faces of the hook-like extremity and a spring which is bent relatively sharply upon itself to form two nearly parallel legs has similar coils formed in the legs which are received respectively upon the ends of the pivot pin for positioning thereon and the extremities of the legs are received beneath projecting positioning ears on the outer faces of the hook-like extremity and the bight of the opposite end of the spring receives one edge of an operating arm projecting from the blade in a manner to constantly urge the blade to retracted inoperative position.

A SIXTH EXAMPLE, U.S. Pat. No. 4,033,036, Issued on Jul. 5, 1977, to Morris teaches a pole type pruner with an enclosed blade type construction whereby the blade is supported from the sides thru the whole cutting cycle so a thinner blade can be used for easier cutting and less distortion to the wood and bark. This distortion is further reduced by a more choke type, more confining type cutting method, and because regardless of tree limb direction or position the cutting angle of the blade can be directed nearly perpendicular to the limb due to the use of a pole section angle changing box. A pruning saw, one end pivoted to the end of the cutter blade handle, sheathed when desired, being used as part of the cutter blade pull system makes the saw always conveniently available to be pivoted to proper angle of saw direction and clamped to the cutter blade in this position for saw pruning and yet eliminates an awkward outward projection when it's not used for saw pruning. The twist type of blade return coil spring used also reduces any awkward projection. A steel cable removably hooked to the other end of the pruning saw and confined always in near proximity alignment to the pole sections and pulled by the inherent leverage of a windlass as part of and attached to a bottom pole section creates a power and ease of blade pull and cutting really beneficial to tree pruning.

A SEVENTH EXAMPLE, U.S. Pat. No. D366,835, Issued on Jun. 29, 1993, to Lutzke teaches an ornamental design for a tree pruner hook, as shown and described.

AN EIGHTH EXAMPLE, U.S. Pat. No. 5,241,752, Issued on Sep. 7, 1993, to Lutzke et al. teaches a pole-mounted pruning tool having a shank adapted to support a cutting implement in a disposition suitable for severing a branch or the like. The shank merges into a hook having a jaw. The hook has a slot through which a cutting blade pivots during a pruning operation, the cutting blade cooperating with the jaw to sever a limb to be trimmed. The cutting blade biasing member, which urges the blade into a normally open position outside the bight of the jaw, is substantially received in a recess of the shank so that the pruning tool is less susceptible to becoming caught in congested foliage areas during pruning operations.

A NINTH EXAMPLE, U.S. Pat. No. 6,526,664 B2, Issued on Mar. 4, 2003, to Cech teaches a low profile tree pruning tool is provided having a head assembly coupled to an upper region of an elongated handle member and a pulley coupled to the head where the pulley is configured to rotate about a fixed axis. A lopping mechanism is coupled to the head and an actuating line couples the lopping mechanism to the pulley. A transfer line couples the pulley to a slide block and a stationary block is rigidly coupled to the handle member below the head. A tension line has a first end coupled to the slide block and is configured to movably engage the stationary and slide blocks.

It is apparent now that numerous innovations for pruning tools have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a pole saw head having a rope setting auxiliary hook that avoids the disadvantages of the prior art.

ANOTHER OBJECT of the present invention is to provide a pole saw head having a rope setting auxiliary hook that is simple and inexpensive to manufacture.

STILL ANOTHER OBJECT of the present invention is to provide a pole saw head having a rope setting auxiliary hook that is simple to use.

BRIEFLY STATED, STILL YET ANOTHER OBJECT of the present invention is to provide a pole saw head which comprises a cheek plate having an integral downwardly curved arm and an integral upwardly rope setting auxiliary notched hook strategically positioned on an end of the arm. The notched hook will hold a loop of a length of rope tied in a monkey's fist knot thereto. A mechanism is for coupling the cheek plate to a top end of a pole. When the pole is manually manipulated by a person grasping the pole the notched hook can release the loop on the monkey's fist knot, so that the monkey's fist knot will appropriately uncoil when the rope is tossed over a branch of a tree.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 1 is a diagrammatic perspective view showing an embodiment of the present invention in use;

FIG. 2 is an enlarged diagrammatic perspective view of the pole saw head and a rope tied in a monkey's fist knot about to be installed upon the rope setting auxiliary notched hook;

FIG. 3 is a diagrammatic exploded perspective view of the pole saw head per se;

FIG. 4 is an enlarged diagrammatic elevational view, with parts broken away, taken of the area enclosed enclosed in the dotted circle indicated by arrow 4 in FIG. 2, showing the notched hook in greater detail;

FIG. 5 is an enlarged diagrammatic perspective view, with parts broken away, of the area enclosed in the dotted circle indicated by arrow 5 in FIG. 3;

FIG. 6 is a diagrammatic cross-sectional view, with parts broken away, taken on line 6-6 of FIG. 5;

FIG. 7 is a diagrammatic cross-sectional view, with parts broken away, taken on line 7-7 of FIG. 5; and FIG. 8 is an enlarged diagrammatic cross sectional view, with parts broken away, taken on line 8-8 in FIG. 1.

A MARSHALING OF REFERENCE NUMERALS UTILIZED IN THE DRAWING

| | |
|---|---|
| 10 | pole saw head |
| 12 | cheek plate of pole saw head 10 |
| 14 | arm of cheek plate 12 |
| 16 | notched hook of cheek plate 12 |
| 18 | loop of rope 20 |
| 20 | rope |
| 22 | monkey's fist knot of rope 20 |
| 24 | coupling mechanism of pole saw head 10 |
| 26 | top end of pole 28 |
| 28 | pole |
| 30 | person |
| 32 | branch of tree 34 |
| 34 | tree |
| 36 | retaining mechanism of pole saw head 10 |
| 38 | saw blade |
| 39 | side of cheek plate 12 |
| 40 | connector of coupling mechanism 24 |
| 42 | open top end of connector 40 |
| 44 | open bottom end of connector 40 |
| 46 | tang of cheek plate 12 |
| 48 | block of coupling mechanism 24 |
| 50 | first fastener assembly of coupling mechanism 24 |
| 52 | second fastener assembly of coupling mechanism 24 |
| 54 | pin of retaining mechanism 36 |
| 56 | bolt of retaining mechanism 26 |
| 58 | threaded shank of bolt 56 |
| 60 | end of saw blade 38 |
| 62 | hole in end 60 |
| 64 | mounting plate of retaining mechanism 36 |
| 66 | bore in mounting plate 64 |
| 68 | aperture in mounting plate 64 |
| 70 | wing nut of retaining mechanism 36 |
| 72 | flat surface on the cheek plate 12 |

DETAILED DESCRIPTION OF THE PREFERRED EMBODIMENT

Referring now to the figures, in which like numerals indicate like parts, and particularly to FIGS. 1, through 8, which are a diagrammatic perspective view showing an embodiment of the present invention in use; an enlarged diagrammatic perspective view of the pole saw head and a rope tied in a monkey's fist knot about to be installed upon the rope setting auxiliary notched hook; a diagrammatic exploded perspective view of the pole saw head per se; an enlarged diagrammatic elevational view, with parts broken away, taken of the area enclosed in the dotted circle indicated by arrow 4 in FIG. 2, showing the notched hook in greater detail; an enlarged diagrammatic perspective view, with parts broken away, of the area enclosed in the dotted circle indicated by arrow 5 in FIG. 3; a diagrammatic cross-sectional view, with parts broken away, taken on line 6-6 of FIG. 5; a diagrammatic cross-sectional view, with parts broken away, taken on line 7-7 of FIG. 5; and an enlarged diagrammatic cross sectional view, with parts broken away, taken on line 8-8 in FIG. 1, and as such, will be discussed with reference thereto.

The present invention is a pole saw head 10 which comprises a cheek plate 12 having an integral downwardly curved arm 14 and an integral upwardly rope setting auxiliary notched hook 16 strategically positioned on an end of the arm 14. The notched hook 16 will hold a loop 18 of a length of rope 20 tied in a monkey's fist knot 22 thereto. A mechanism 24 is for coupling the cheek plate 12 to a top end 26 of a pole 28. When the pole 28 is manually manipulated by a person 30 grasping the pole 28 the notched hook 16 can release the loop 18 on the monkey's fist knot 22, so that the monkey's fist knot 22 will appropriately uncoil when the rope 20 is tossed over a branch 32 of a tree 34. A flat surface 72 on the cheek plate 12 is extremely useful for pushing branches, limbs etcetera when the user so desires.

The pole saw head further comprises a mechanism 36 for retaining in a removable manner a saw blade 38 to a side 39 of the cheek plate 12. When the pole 28 is manually manipulated by the person 30 grasping the pole 28, the saw blade 38 can cut off branches 32 from the tree 34.

The coupling mechanism 24 comprises a box-shaped connector 40 having an open top end 42 and an open bottom end 44, wherein the bottom end 44 fits onto the top end 26 of the pole 28. A tang 46 is integral with and extends downwardly from the cheek plate 12, wherein the tang 46 will fit into the open top end 42 of the connector 40. A pair of blocks 48 are provided which fits snugly into the open top end 42 of the connector 40 on opposite sides of the tang 46 of the cheek plate 12. A fastener assembly 50, such as carriage bolt and nuts, secures the connector 40 to the top end 26 of the pole 28. The coupling mechanism 24 can further comprise a second fastener assembly 52, such as a carriage bolt and nut, to secure the blocks 48 and the tang 46 within the open top end 42 of the connector 40.

The retaining mechanism 36 comprises a plurality of pins 54 extending from the side 39 of the cheek plate 12. A plurality of bolts 56 have threaded shanks 58 extending through the cheek plate 12. When an end 60 of the saw blade 38 is placed against the cheek plate 12, the pins 54 will be positioned about the end 60 of the saw blade 38, while one threaded shank 58 of one bolt 56 will extend through a hole 62 in the end 60 of the saw blade 38. A mounting plate 64 is provided having a plurality of bores 66 which match up with the pins 54, and a plurality of apertures 68 which match up with the threaded shanks 68 of the bolts 56. When the mounting plate 64 is placed against the end 60 of the saw blade 38, the threaded shanks 58 of the bolts 56 will extend through the apertures 68 in the mounting plate 64. A plurality of wing nuts 70 are also provided, which thread onto the threaded shanks 58 of the bolts 56, wherein the mounting plate 64 will then retain the saw blade 38 in place against the side 39 of the cheek plate 12. It is to be noted, after the mounting plate 64 is secured in place abutting against the saw blade 38, that the four pins 54 have been located abutting against the saw blade 38 in such a manner that the saw blade 38 is totally prevented from having any movement with respect to the cheek plate 12 of the pole saw 10, as best seen in FIG. 8.

It will be understood that each of the elements described above, or two or more together, may also find a useful application in other types of constructions differing from the types described above.

While the invention has been illustrated and described as embodiments of a pole saw head having a rope setting auxiliary hook, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A pole saw which comprises:
   A) a cheek plate having an integral downwardly curved, arm and an integral upwardly rope setting auxiliary notched hook strategically positioned on an end of said arm, wherein said notched hook will hold a loop of a length of rope tied in a monkey's fist knot thereto; and
   B) means for coupling said cheek plate to a top end of a pole, wherein when the pole is manually manipulated by a person grasping the pole said notched hook can release the loop on the monkey's fist knot, so that the monkey's fist knot will appropriately uncoil when the rope is tossed over a branch of a tree, wherein said coupling means comprises:
      a) a box-shaped connector having an open top end and an open bottom end, wherein said bottom end fits onto the top end of the pole;
      b) a tang integral with and extending downwardly from said cheek plate, wherein said tang will fit into said open top end of said connector;
      c) a pair of blocks which fits snugly into said open top end of said connector on opposite sides of said tang of said cheek plate; and
      d) a fastener assembly to secure said connector to the top end of the pole.

2. The pole saw as recited in claim 1, further comprising means for retaining in a removable manner a saw blade to a side of said cheek plate, wherein when the pole is manually manipulated by the person grasping the pole, the saw blade can cut off branches from the tree.

3. The pole saw as recited in claim 2, wherein said retaining means comprises:
   a) a plurality of pins extending from said side of said cheek plate;
   b) a plurality of bolts having threaded shanks extending through said cheek plate, wherein when an end of the saw blade is placed against said side of said cheek plate, said pins will be positioned about the end of the saw blade, while one said threaded shank of one said bolt will extend through a hole in the end of the saw blade;
   c) a mounting plate having a plurality of bores which match up with said pins, and a plurality of apertures which match up with said threaded shanks of said bolts, wherein when said mounting plate is placed against the end of the saw blade, said threaded shanks of said bolts will extend through said apertures in said mounting plate; and
   d) a plurality of wing nuts which thread onto said threaded shanks of said bolts, wherein said mounting plate will then retain the saw blade in place against said side of said cheek plate.

4. The pole saw as recited in claim 1, wherein said coupling means further comprises a second fastener assembly to secure said blocks and said tang within said open top end of said connector.

\* \* \* \* \*